United States Patent [19]
Leising et al.

[11] 3,956,947
[45] May 18, 1976

[54] ADAPTIVE CONTROL SYSTEM FOR AUTOMATIC TRANSMISSION

[75] Inventors: Maurice Bernard Leising, Clawson; Howard Lee Benford, Bloomfield Hills; Robert Leslie Bradley, Troy, all of Mich.

[73] Assignee: Chrysler Corporation, Highland Park, Mich.

[22] Filed: June 14, 1974

[21] Appl. No.: 479,320

[52] U.S. Cl. .............................. 74/866; 74/752 A; 192/103 C
[51] Int. Cl.² ...................... B60K 41/18; F16H 3/74; F16D 43/06
[58] Field of Search ............ 74/866, 867, 868, 869, 74/844, 752 A; 192/103 C

[56] References Cited
UNITED STATES PATENTS

| | | | |
|---|---|---|---|
| 3,321,056 | 5/1967 | Winchell et al. | 74/844 X |
| 3,448,640 | 6/1969 | Nelson | 74/866 |
| 3,650,162 | 3/1972 | Leising et al. | 74/868 X |
| 3,684,066 | 8/1972 | Kubo et al. | 74/866 X |
| 3,713,351 | 1/1973 | Sakakibara et al. | 74/866 X |
| 3,719,096 | 3/1973 | Sprague et al. | 74/866 X |
| 3,747,438 | 7/1973 | Toyoda et al. | 74/866 |
| 3,754,482 | 8/1973 | Sanders et al. | 74/752 A |

*Primary Examiner*—Samuel Scott
*Assistant Examiner*—Lance W. Chandler
*Attorney, Agent, or Firm*—Talburtt & Baldwin

[57] ABSTRACT

A control system for an automatic transmission of the type having an input shaft assembly, an output shaft assembly, a plurality of power transmitting gear assemblies connecting the input shaft assembly and output shaft assembly and adapted to be coupled to provide various ratios between input and output shaft assembly rotation, engaging devices for effecting changes in the ratios provided by the power transmitting gear assemblies, and servos for operating the engaging devices. Pressure regulating devices are provided for controlling the application of pressurized fluid to the servo means, and control apparatus is provided which is responsive to the rate of change of rotational speed, i.e., acceleration, of at least one of the rotatable components of the assemblies to control the output torque of the transmission during a shift from one ratio to another.

5 Claims, 12 Drawing Figures

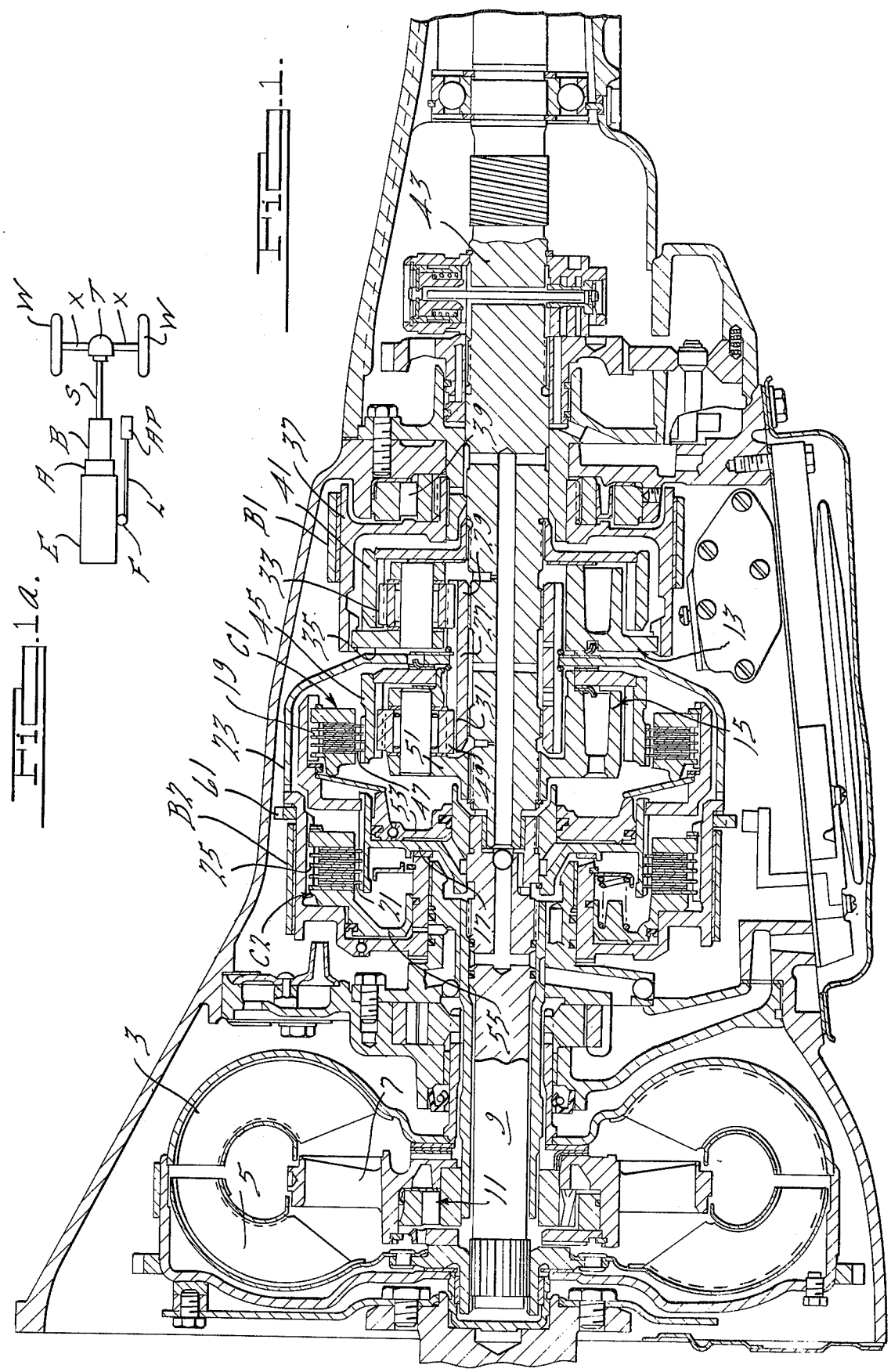

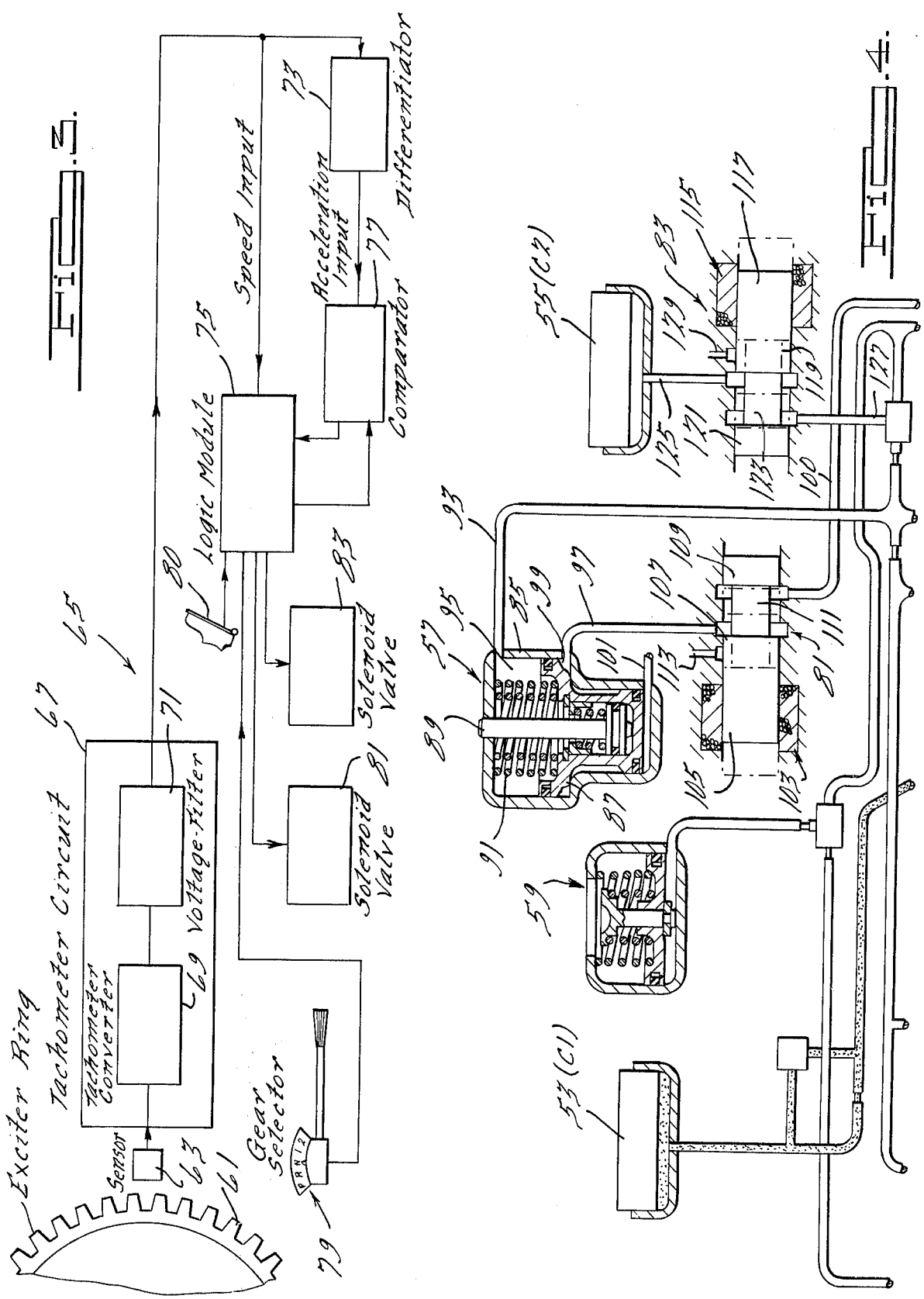

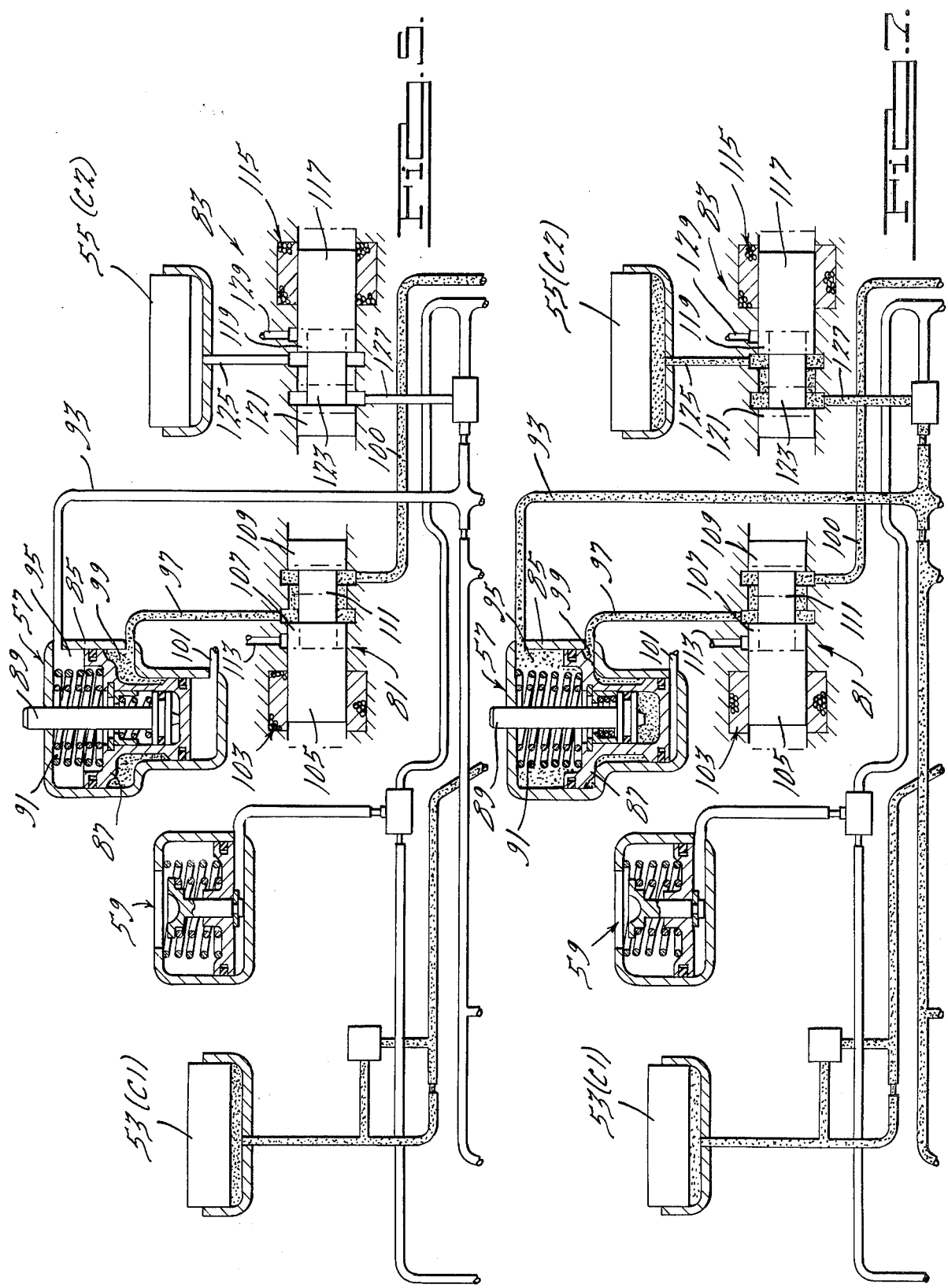

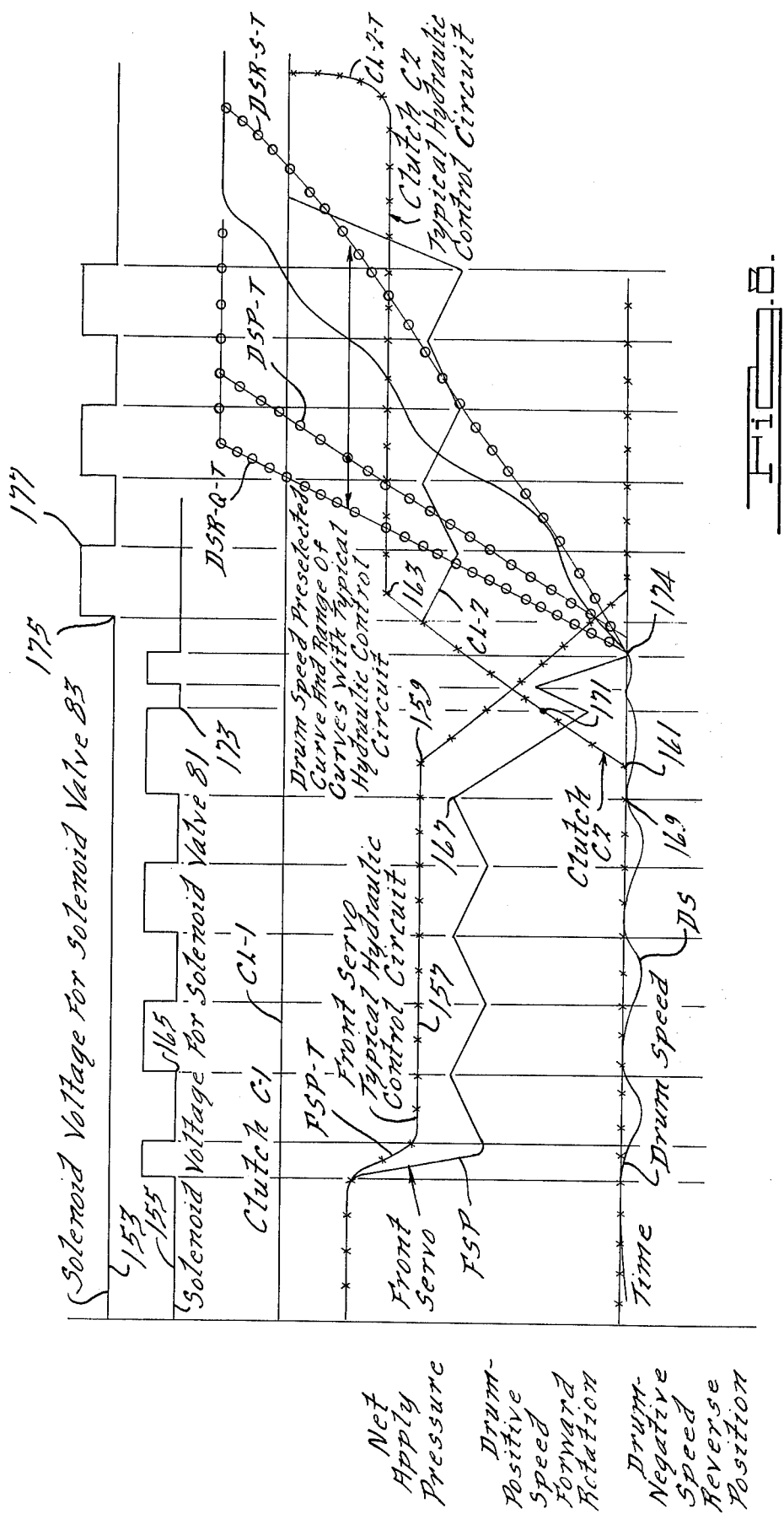

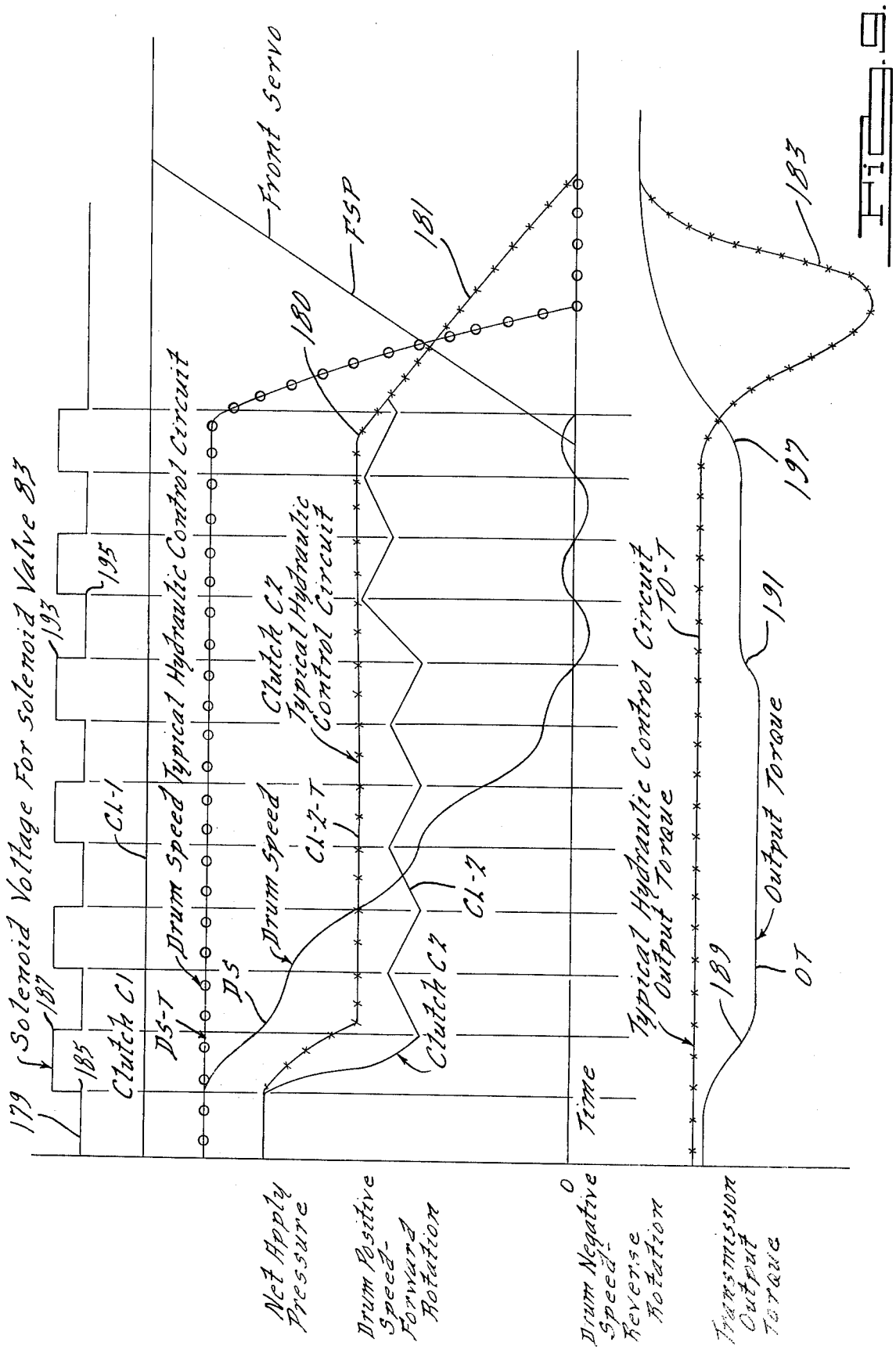

ADAPTIVE CONTROL SYSTEM FOR AUTOMATIC TRANSMISSION

BACKGROUND OF THE INVENTION

This invention relates to a power transmission unit primarily intended for motor vehicle use and is particularly concerned with the control of the engagement and disengagement of friction engagement devices used in providing various drive ratios in a power transmission.

Power transmissions of the type to which this invention relates include a plurality of friction engagement devices, such as band and drum brake devices, and plate type clutches, for example. These engagement devices are normally actuated by hydraulically operated servos which, upon the supply of pressure or the relief of pressure, either cause actuation or deactuation of the respective friction engagement device for effecting speed changes in the transmission. In some cases pressure is applied to only one servo to cause actuation of the friction engagement device associated therewith and thereby effect the speed change. In other cases it is necessary to apply the hydraulic pressure to one servo and relieve the pressure in another servo to actuate one friction device and deactuate another friction device for effecting the speed change.

The timing of the supply and relief of the pressure to the servos obviously affects and controls the smoothness of the shift. If pressure is applied to two servos at the same time, one friction engagement device would cause a dragging phenomenon or fight with another friction engagement device. Automatic transmissions are initially designed with hydraulic controls that, for any given throttle opening and engine speed, are designed to cause a rotatable element, such as a drum, to increase or decrease its rate of rotation so that a graph of such rate against time follows a predetermined curve. The manufacturer or designer chooses this curve so that it represents a shift which is generally acceptable to the public, i.e., so that a shift from one speed ratio to another takes place in a predetermined period of time with as little harshness as possible.

As the various components of the friction engagement elements wear or if engine performance varies due to changes in altitude or malfunctioning of components, for example, the time in which a shift takes place, and hence the rapidity of the increase or decrease in the speed of rotating elements changes so that a graph of such rate of speed change versus time no longer follows the original predetermined curve. The time for the shift changes therefor vary over a range and may make the actual shift uncomfortable, or in an extreme condition of wear or altitude change, may be of such length that friction engagement members are subject to excessivee wear and may be excessively heated. The present invention obviates many of the objectionable features of the previously known controls for automatic transmissions.

SUMMARY OF THE INVENTION

Briefly, the present invention comprises means for controlling the rate of change of rotation, i.e., acceleration, of various rotatable members of an automatic transmission to maintain uniform shift changes.

One of the primary objects of this invention is to provide an automatic transmission in which the shift quality is maintained uniform regardless of the engine size, within engine performance variations or component condition, i.e., the transmission control is adaptive to changes in engine performance or in the condition of the various friction engagement components of the transmission.

Another object of the present invention is to provide an automatic transmission in which the fight between two friction engagement devices as one is applied and another is released is minimized, thereby increasing the smoothness of the load transfer between elements.

A further object of this invention is to provide a transmission such as described in which altitude changes on the feel of a shift between two speed ratio ranges is minimized.

Another object of this invention is to provide a transmission such as described in which the rate of rotation of rotatable members of the transmission can be maintained relativey close to a predetermined optimum or desired rate of rotation of such members so that deterioration of friction will not result in premature transmission failure.

Still another object of this invention is to provide a transmission of the type described in which electrical controls are operable in response to the speed or rate of change of rotation of one or more components of the transmission to control the application or relief of hydraulic pressure to various servo mechanisms, such as hydraulically operated clutches, or hydraulically operated band applying devices, to control the actuation or deactuation thereof.

A further object of this invention is to provide a transmission of the class described in which the control components are economical in construction and efficient in operation.

Other objects and advantages will be made apparent as the description progresses.

BRIEF DESCRIPTION OF THE DRAWINGS

In the accompanying drawings in which various embodiments of this invention are illustrated, FIG. 1 is a sectional elevational view of one embodiment of a power transmission unit constructed in accordance with this invention;

FIG. 1a is a schematic view of a motor vehicle drive train that includes a power transmission unit embodying this invention;

FIG. 3 is a block diagram showing construction of a shift control system incorporated in an embodiment of the present invention;

FIG. 4 is a fragmentary diagrammatic view of the hydraulically operated control system for the transmission shown in FIG. 1, the portion shown being related to the lines connected to the servo mechanisms for actuating friction engagement devices, the control being shown in the Drive position and being conditioned for Breakaway for a first forward speed ratio;

FIG. 5 is a view similar to FIG. 4 with the control in the Drive position, and the transmission conditioned for second forward speed;

FIG. 7 is a view similar to FIGS. 4 and 5 with the controls in the Drive position and the transmission conditioned for third forward speed;

FIG. 8 is a graphical representation of hydraulic pressures, rotational speeds and voltage relative to various components as a function of time during a shift from a second speed condition to a third or direct drive condition; and FIG. 9 is a graphical representation of hydraulic pressures, rotational speeds, voltages and torque relative to various components of the transmission as function of time during a shift from a third speed condition to a second speed condition.

Like parts are indicated by corresponding reference characters throughout the several views of the drawings.

DESCRIPTION OF THE PREFERRED EMBODIMENT

Figure 2A:
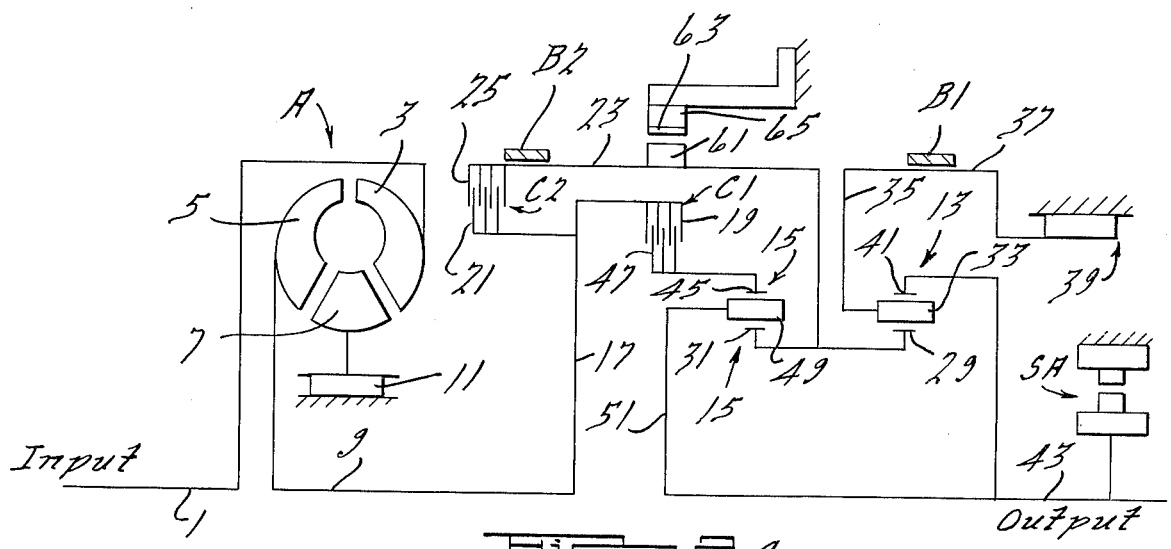
FIG. 2a is a schematic line diagram of the power transmission unit shown in FIG. 1.

FIG. 1a of the drawings diagrammatically discloses a motor vehicle power plant and drive train comprising an internal combustion engine E drivingly connected to a power transmission unit that includes a hydrokinetic type of torque converter device A drivingly connected to a change speed gear box B. The output from gear box B drives a propeller shaft or drive shaft S that transmits drive through a differential unit T and axles X to the rear wheel W of the vehicle. The engine E has a carburetor F that is connected by an accelerator pedal AP through linkage L.

The power transmission unit includes an input shaft 1 connected to an impeller 3 of the torque converter A, which also includes a turbine wheel or runner member 5 and a guide or reaction member 7. The turbine wheel 5 is drivingly connected to the forward end portion of a torque converter driven shaft member 9. The guide wheel 7 is rotatably mounted by a one-way brake device 11. This device is arranged such that it will permit only forward rotary movement to be transmitted to the guide wheel 7 by the forward rotation of the impeller. The brake 11 continuously prevents rotation of the guide wheel in a reverse direction.

The converter driven shaft 9 member is adapted to transmit drive from the turbine member 3 of the torque converter device A to the planetary gearing of the gear box unit B that is arranged rearwardly of and in series with the torque converter device. The converter driven shaft 9 thus provides the input to the gear box B.

The gear box B generally includes a forward drive clutch C1, a direct drive clutch C2 and a pair of planetary gear trains 13 and 15 that are adapted to cooperate with the torque converter device A to provide means for the transmission of three forward drives and a reverse drive to propeller shaft S. More specifically, a spider assembly 17 drivingly connected to shaft 9 carries a series of annular clutch plates 19 which form part of clutch C1 and a series of clutch plates 21 which form part of clutch C2.

A drum assembly 23 has a series of clutch plates 25 interleaved with clutch plates 21 and is adapted to be prevented from rotational movement by the application of a brake band B2 which surrounds a portion of the drum as it is adapted to be applied thereto by conventional means as hereinafter explained.

Drum 23 is connected to a sleeve 27 carrying the sun gears 29 and 31 of planetary gear sets 13 and 15, respectively. Gear set 13 includes planet pinions 33 rotatably connected to a carrier assembly 35. Carrier assembly 35 includes a drum portion 37 adapted to be engaged by a brake band B1 and is also constrained against reverse rotation by means of a one-way brake device 39. An annular gear 41 of gear set 13 is connected to an output shaft 43 attached to propeller shaft S.

An annular gear 45 of planetary gear set 15 has a series of clutch plates 47 of clutch C1 mounted thereon. Planet pinions 49 are mounted on a carrier 51 drivingly connected to output shaft 43.

The forward drive clutch C1 is engaged whenever any of the three forward speeds is being utilized and it is disengaged whenever the transmission controls are set in either a Neutral or Reverse position. The direct drive clutch C2 is engaged only when the third or Direct drive forward speed is being transmitted or whenever Reverse drive is being transmitted. The different clutches and brakes that are applied for transmitting the several drive ratios obtainable with this transmission are set forth below:

| Drive Ratio: | Members Applied: |
|---|---|
| Low (first) | C1 and B1 or 39 |
| Kickdown (second) | C1 and B2 |
| Direct (third) | C1 and C2 |
| Reverse | C2 and B1 |

The clutches C1 and C2 are adapted to be actuated by hydraulically operated clutch applying piston and cylinder assemblies 53 and 55, respectively. Brake band B2 is adapted to be actuated by a hydraulically operated servo device 57 while band B1 is adapted to be applied by a hydraulically operated reverse servo 59.

The components described so far are old and a more specific description of the various components may be found in U.S. Pat. No. 3,650,162.

As mentioned above, the timing of the supply and relief of the hydraulic pressure to the servos and the clutches controls the smoothness or abruptness of the shift from one speed ratio to the next. To achieve the present invention, various components are provided to insure that the application or relief of pressure to the servos or clutches is controlled and made responsive to the rotational acceleration or rate of change in speed of certain elements so that the torque output of the transmission can be controlled.

As shown in FIGS. 1 and 2a and 3, one embodiment includes a toothed exciter ring 61 attached to the outside of drum assembly 23. A sensor 63 of a control circuit 65 is adapted to sense the teeth of the exciter as the latter rotates. The sensor 63 emits a signal to a tachometer circuit 67 which may, as shown, include a tachometer converter 69 for converting the sensor signal having a sine wave form, for example, to a square wave form, for example, and a voltage-filter 71 for filtering out unnecessary or unwanted variations. The tachometer circuit supplies a signal corresponding to the rotational speed of the drum 23 to a differentiator 73 and a logic module 75. The differentiator differentiates the signal received to emit a signal indicative of acceleration to a comparator 77.

A signal from a gear selector 79 and a position signal from a throttle 80 are also supplied to the logic module and together with an operating gear ratio signal within the logic and the speed input signal are combined to determine a desired acceleration level which is supplied to the comparator 77. The acceleration input from differentiator 73 is then compared to the desired acceleration input signal received from the logic module. The comparator determines if the acceleration of the particular element the speed of which is being sensed is greater or less than the desired acceleration, and an appropriate signal is sent to the logic module 75, which then sends an appropriate signal to activate a solenoid valve 81 or 83. As will be made apparent, these solenoid valves 81 and 83 either permit the hydraulic fluid to be applied to or vented from the servo 57 or clutch 55. This in turn actuates or deactuates the brake band B2 or clutch C2. It may be desirable or necessary to include a second sensor assembly for 5A for sensing the rotational speed of the output shaft 43, which assembly would operate cooperatively with sensor 63 in determining the speed of the rotating component or components.

As shown in FIG. 4, for example, servo 57 includes a housing or cylinder 85, with a piston 87 movable therein adapted to move a strut 89 outwardly of the cylinder for tightening brake band B2 around drum assembly 23. Spring means 91 are adapted to oppose outward movement of strut 89. A hydraulic line 93 is connected to a chamber 95 found between the upper end of piston 87, as viewed in FIG. 4 and one end of the housing 85. The line 93 extends from chamber 93 to the hydraulic circuit, which may be similar to the circuit disclosed in U.S. Pat. No. 3,650,162. A line 97 connects a chamber 99 formed between an end portion of the cylinder 85 and the other side of the piston 87 to the solenoid valve 81, which in turn is connected to the hydraulic control circuit by a line 100. A vent 101 is connected between cylinder 85 and a sump (not shown) in the hydraulic control circuit.

Solenoid valve 81 includes a solenoid coil portion 103 which when energized moves a spool valve 105 from the solid line position shown in FIGS. 4, 5 and 7 to the broken line position shown in FIGS. 5 and 7. The spool valve, as shown, includes two bands or shoulders 107 and 109 provided by a shaft 111 of a reduced diameter. In the solid line position, communication between lines 97 and 100 is established while in the broken line position the solenoid valve blocks communication between lines 97 and 100, but establishes communication between line 97 and a vent 113 connected to the sump (not shown).

Solenoid valve 83 includes a coil portion 115 which when energized moves a spool valve 117 from the solid line position shown in FIGS. 4, 5 and 7 to the broken line position shown in FIGS. 5 and 7. The spool valve 117, as shown, includes two lands or shoulders 119 and 121 joined by a shaft 123 of a reduced diameter. In the solid line position communication between a line 125 and a line 127 is established, while in the broken line position the solenoid valve blocks communication between lines 125 and 127, but establishes communication between line 125 and a vent 129 connected to the sump (not shown). The lines 100 and 127 are connected to the hydraulic control system, which may be similar to the control system shown in the aforenoted U.S. Pat. No. 3,650,162.

Figure 6:
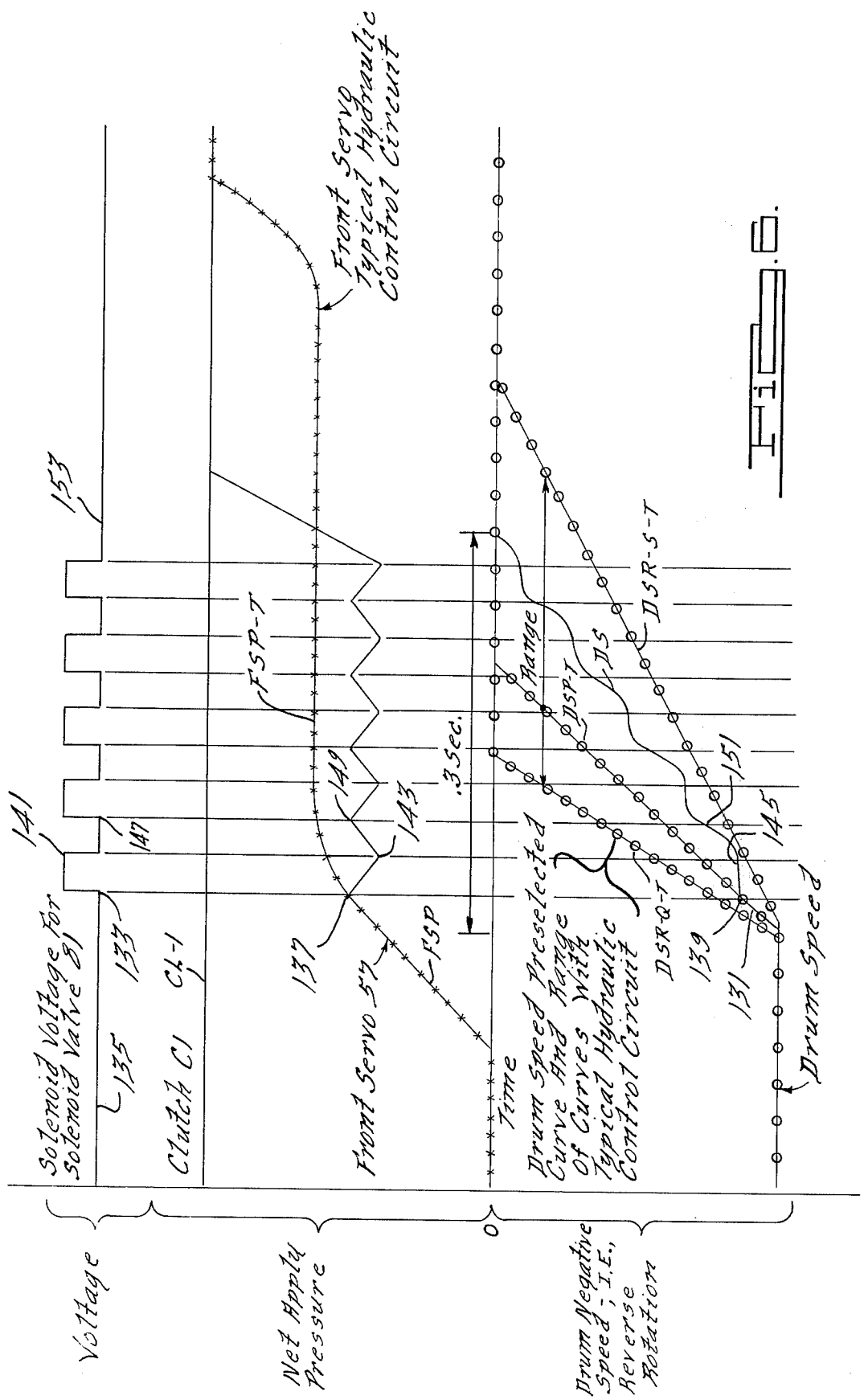
FIG. 6 is a graphical representation of hydraulic pressures, rotational speeds and voltage relative to various components as a function of time during a shift from a first speed condition to a second speed condition.

FIG. 6 is a graphical representation of the voltage across the solenoid 103, the net apply pressure on the piston 53 of clutch C1, the net apply pressure on the servo 57 which actuates band B2, the net apply pressure on the band apply servo of a conventional or typical hydraulic control circuit, the speed of drum assembly 23 in this invention and the speed range of a drum assembly 23 when controlled by a typical hydraulic circuit, all as a function of time during a shift from a first speed condition to a second speed condition.

When the transmission selector is set in a Drive position, and the transmission is in a first speed condition, the hydraulic circuit and pump apparatus is applying a predetermined pressure on the piston 53 to engage clutch C1, as is necessary to achieve the first speed condition for any given throttle opening. This pressure is illustrated by the line C1–1 in FIG. 6. The drum assembly 23, since it is connected to sungear 27, is moving in a reverse direction at some speed, depending upon the speed of rotation of input shaft 9. When the vehicle reaches a predetermined speed, fluid under pressure, with a typical hydraulic control unit, will be supplied to the servo 57. This pressure will build up to and by held at a predetermined level as the reversely rotating drum assembly speed is reduced to zero, i.e., brought to a stop, and then increased up to the same level as is applied to clutch C1 after the drum assembly 23 is stopped. The pressure applied to a front servo by a typical hydraulic control circuit is shown by the curve FSP-T (Front Servo Pressure Typical) in FIG. 6.

When the control circuit for a typical non-adaptive transmission is designed, the valves, springs, orifices, and other components are sized so that the reverse rotation of the drum assembly will be brought to a halt within a predetermined period of time, if all components are exactly as designed, and are not too badly worn, and the vehicle is at a predetermined altitude. This predetermined period of time may be slightly less than actually desired to compensate for manufacturing irregularities, altitude and other variations. As shown in FIG. 6, the preselected drum speed curve for a shift from a first speed condition to a second speed condition is shown by DSP-T (Drum speed is preselected - typical control system). It will be noted that the period for bringing the drum assembly 23 to a halt and thus placing the transmission in a second speed condition is something less than 0.3 of a second for the given throttle position represented by the graph. It may be assumed that the actual desired time period for effecting the shift for the particular throttle position is 0.3 of a second.

Due to changes in altitude and engine variations, etc., wear on transmission components, the speed curve of the drum assembly 23 of a typical hydraulically controlled transmission is likely to fall within a range, rather than always along the curve DPS-T. This range is illustrated by the curves DSR-Q-T (Drum Speed Range-Quick-Typical) and DSR-S-T(Drum Speed Range-Slow-Typical). If the time period in which the drum assembly 23 is stopped is too short, the shift will feel quite harsh and unsatisfactory. If the time period in which the drum assembly is stopped is too long, the shift is not only unsatisfactory because of such slowness, but also the friction on the band B2 will tend to cause the latter to burn or wear extremely rapidly, thus further causing deviations from the preselected drum speed curve. Thus, variation in the condition of the transmission components, or engine variation as well as variations in altitude, may affect the performance of a transmission in many ways.

As will now be described, the apparatus of this invention is such that the control circuit is able to adapt to variations in the condition of components and in altitude so that a substantially consistent drum speed curve is attained regardless of component condition and altitude.

In the apparatus of this invention, when the vehicle reaches a particular predetermined speed for a particular throttle opening, signalling that the transmission should be shifted from a first speed condition to a second speed condition, the hydraulic pressure supplied to the front servo 57 increases. The solenoid valve 81 is in its solid line position to place lines 97 and 100 in communication with one another. The pressure builds up along line FSP (FIG. 6) and at some point the servo will begin applying band B2 to the drum assembly 23, thus starting to slow the latter. This slowing of the drum assembly is shown at portion 131 of curve DS. It will be assumed that the desired drum speed curve is one that will, at a substantially constant of rate deceleration, slow the drum to a halt in 0.3 of a second.

The sensor 63 senses the rotational speed of the exciter ring 61 attached to drum assembly 23. As the drum assembly begins to slow down, due to the application of band B2, the slower speed signals are sent to the differentiator and logic module, and a signal representing the deceleration is supplied to the comparator, as set forth previously. This signal is compared with the signal indicative of the desired deceleration, received from logic module 75, and if the actual deceleration is not greater than the desired acceleration level or greater than a predetermined amount more than the desired deceleration, no actuating signal is given to solenoid valve 81. However, when the actual deceleration reaches the desired level or predetermined amount greater than the desired deceleration level, a signal is issued from the logic module to actuate solenoid valve to 81. This point is indicated at point 133 on solenoid voltage curve 135, point 137 on curve FSP, and point 139 on curve DS. The solenoid valve 81 shifts to its broken line position as shown in FIG. 5, thereby blocking communication between lines 97 and 100 and interrupting the supply of pressurized fluid to the servo 57. The pressurized fluid in chamber 99 may be vented through lines 97 and 113 under the influence of spring 91.

Since the band B2 begins to release drum assembly 23, the latter will begin to decrease its rate of deceleration, because of the drive supplied thereto through front planetary gear set 15. Thus, the curve DS begins to flatten at the point 139, indicating that the drum is starting to decrease its deceleration and approach the desired deceleration level. The deceleration decreases until it reaches the desired level or predetermined amount less than the desired deceleration level at that point in the shift. A signal is then issued from the logic module 75 to deactuate solenoid valve 81. This point is indicated at 141 on solenoid voltage curve 135, at 143 on curve FSP and at point 145 on curve DS.

When the solenoid valve 81 is deactuated, it returns to the solid line position, and pressurized fluid is then supplied to the servo chamber 95 by the hydraulic control circuit through lines 100 and 97. The servo is applied and band B2, as it tightens on drum assembly, increases the deceleration of such drum assembly. This slowing of drum assembly 23 continues until the actual deceleration of such assembly again reaches the desired deceleration level or predetermined amount greater than the desired deceleration level, at which time a signal is again issued to actuate solenoid valve 81. This point is shown at 147 on solenoid voltage curve 133, at 149 on curve FSP and at 151 on curve DS.

This process of actuating and deactuating the solenoid valve 81 is repeated as necessary to cause the speed of drum assembly 23 to follow in an undular manner approximately along the predetermined path necessary to bring such drum to a completed stop in the desired time interval. As the drum assembly is brought to a complete stop the servo is being supplied with pressurized fluid through the solenoid valve 81, which is open or de-energized as indicated at 153. No signal is sent to shift the valve to its broken line position, so the pressure in the servo continues to increase up to the same level as exists in clutch Cl, i.e., to what is referred to as line pressure. The drum assembly 23 is held against rotation as long as the servo 57 is supplied with line pressure fluid and thus, a second speed condition will be maintained.

It will be seen that the drum speed deceleration is held close to the desired rate of deceleration so that the speed change from a first speed condition to a second speed condition is accomplished in the time period desired for the particular throttle position. This rate of deceleration is maintained regardless of the altitude at which the speed change is taking place and regardless of the condition, within limits, of the brake band B2 or other components of the transmission. Obviously, as the throttle openings are varied, the slope of the drum speed curve, i.e., the deceleration, and the time period in which it is desired to effect the speed change, varies. The logic circuitry necessary to accomplish these desired shift deceleration curves may be provided in logic module, so that the gear selector throttle opening and speed input signals may, as a result of a calculation or formula, require the desired deceleration level signal to be sent to the comparator. The apparatus is thus capable of adapting itself to provide a uniform shift regardless of engine performance or band condition. The apparatus is responsive to the rate of change of the rotational speed of the drum assembly for controlling the torque output from the transmission during the shift from a first speed condition to a second speed condition.

The control changes to effect a shift from a second speed condition to a third speed condition are described with reference to FIG. 8, which Figure is a graphical representation of the voltage across solenoid 115 of valve 83, shown by curve 153, the voltage across solenoid 103, valve 81, shown by curve 155, the net apply pressure on the piston 53 of clutch C1, the net apply pressure on the piston 55 of clutch C-2, the net apply pressure on the servo 57 which actuates band B2, the net apply pressure on the band apply servo of a conventional or typical hydraulic control circuit, the net apply pressure on the piston of a clutch C-2 of a typical hydraulic control circuit, the speed of drum assembly 23 of this invention, and the speed range of a drum assembly 23 when controlled by a typical hydraulic circuit, all as a function of time during a shift from a second speed condition to a third speed condition under a particular throttle opening condition.

When the transmission selector is set in the Drive position, and the transmission is in a second speed condition, the hydraulic circuit and pump apparatus is applying a predetermined line pressure on the piston 53 of the clutch C-1, which pressure is indicated by the line C1–1 in FIG. 8. The drum assembly 23 is, as noted above in describing the shift from a first to a second speed condition, held against rotation by the band B2, under control of the servo 57. The net pressure applied to a front servo by a typical hydraulic control circuit is shown by the curve FSP-T in FIG. 8 while the net pressure applied to the front servo 57 of this invention is shown by the curve FSP is FIG. 8.

When a typical non-adaptive transmission is designed, the valves, orifices, springs and other hydraulic components are designed and sized so that the drum assembly 23 will be released by band B2 and the clutch C2 will be engaged in a predetermined manner and in a predetermined time period, if all components are exactly as designed and are not too badly worn, and the vehicle is operating at a predetermined altitude. This predetermined time period may be slightly less than actually desired to compensate for manufacturing irregularities. As shown in FIG. 8, the preselected drum speed curve for a shift from a second speed condition to a third speed condition is illustrated by DSP-T (Drum Speed Preselected - Typical Control System). The actual desired time period for increasing the speed of the drum assembly up to the desired speed for this particular throttle opening position is slightly longer than the time period shown for DSP-T, but the transmissions are normally designed to effect the speed changes in a slightly shorter period. However, as mentioned above with respect to the shift from a first speed condition to a second speed condition due to variations in altitude, and due to wear on the components, and variations in engine performance, the speed curve of the drum assembly 23 of a typical hydraulically controlled transmission is likely to fall within a range, rather than always along curve DSP-T. This range is illustrated in FIG. 8 by the curves DSR-Q-T (Drum Speed Range - Quick -Typical) and DSR-S-T (Drum Speed Range - Slow - Typical).

The net apply pressure on the piston of a clutch C-2 of a typical hydraulic control transmission is illustrated by curve CL-2-T (Clutch - 2 Typical Control) in FIG. 8 while the net apply pressure on the piston 55 of clutch C-2 is illustrated by the curve CL-2 in such Figure. In a typical transmission, as the drum assembly 23 is being released by the band B2, the clutch C-2 is being applied to positively drive the drum. If the release of the drum assembly by the band B2 is too fast relative to positive drive imparted to the drum by the clutch C-2, then the band will slip to allow drum assembly 23 to start rotating backwards and the spider 17, shaft 9, and turbine 5 to accelerate, which will in turn allow the impeller 3 and engine to accelerate. If the engine speed is allowed to increase more than a small amount, the resulting noise, torque loss, and shift feel will be objectionable. This is referred to as runaway shift.

When a typical non-adaptive transmission is designed, the valves, orifices, springs, and other components are designed and sized so that a runaway shift will not occur, regardless of manufacturing irregularities, altitude, etc. Thus, the release of band B2 is almost always too slow relative to the positive drive imparted to the drum by clutch C-2. The clutch C-2 and band B2 are thus fighting one another, which contributed to bad shift feel and war of the components. As shown in FIG. 8, this clutch-brake band fight occurs as the clutch pressure CL-2-T increases to actuate clutch C-2 while the band B2 is still holding the drum assembly 23 stationary.

In a typical automatic transmission when the vehicle reaches a particular speed for a particular throttle opening at which the shift from a second speed condition to a third speed condition should be made, a control valve (not shown) will reduce the net pressure supplied to the servo 57 and stroke piston 55 of clutch C-2. The net servo apply pressure will drop to a level indicated by portion 157 of curve FSP-T while the piston is stroking.

Upon completion of the piston stroking, at point 161, the net pressure on clutch C-2 increases and the net pressure applying servo 57 decreases, from point 159. The pressure on clutch C-2 continues to increase to engage the clutch C-2 and attempt to couple spider 17 to drum assembly 23 during the time the brake band B2 is releasing drum assembly 23. When the clutch C-2 pressure is great enough the drum assembly will begin to rotate forward. The clutch C-2 pressure increases to a point 163 at which it levels off and at which time the net apply pressure on servo 57 reaches zero. This level is maintained for a sufficient time to completely couple the drum assembly to spider 17. The pressure then builds up to the line pressure applied to clutch C-1. The actual speed curve of the drum will fall within the range between curves DSR-Q-T and DSR-S-T. As mentioned previously, the variations in the drum speed curve are disadvantageous, as well as the fight which occurs between the clutch C2 and the brake band B2. The apparatus of the present invention reduces this fight as will now be described.

In the present invention after the conventional hydraulic circuitry signals a shift from a second speed condition to a third speed condition, the circuitry described with reference to FIG. 3 will signal the shift change and cause solenoid 103 of solenoid valve 81 to be energized. This moves valve 81 to its broken line position to block communication between lines 97 and 100 and places the chamber 97 in communication with the vent 113. The pressure in the servo immediately drops off thereby causing band B2 to loosen its grip slightly on drum assembly 23. This permits the drum to begin to rotate slightly backwards, but just as it begins to rotate the sensor 63 senses such rotation and through the circuitry shown in FIG. 3, a signal is sent by the logic module 75 to deenergize the solenoid 103. Thus, the valve 81 returns to its solid line position and the pressure in the servo 57 increases. This in turn causes the band B2 to increase its frictional grip on drum assembly 23 and brings it back to a stationary condition. However, just as it stops, as sensed by sensor 63, the speed input and gear input to the logic module 75 cause the latter to signal the solenoid 103 to cause energization thereof. This is indicated at point 165, for example, on curve 155.

This procedure is repeated as necessary to establish a condition in which the drum assembly 23 is just held against significant reverse rotation, i.e., the backward rotation of the drum is incipient and is slowly slipping backward. The acceleration and deceleration of the drum assembly are controlled to maintain this condition. At the point 167 on curve FSP and point 169 on the drum speed curve DS, the solenoid 103 is energized, causing the valve 81 to assume its broken line position and the pressure in servo 57 to drop. Thus, the grip on drum assembly 23 is loosened and the latter starts to slip backwards. However, at this point the pressure applied to the piston 55 of clutch C-2 will start to increase from point 161 and begins to attempt to couple the drum assembly 23 to the spider 17. The coupling effect of the clutch at this point is insufficient to prevent reverse or backwards rotation of the drum. Accordingly, the solenoid 103 is deenergized as shown at 173 and the pressure FSP begins to increase the cause the servo applied band to stop the drum. This cyclic action of solenoid 103 continues as many times as necessary to prevent reverse rotation of the drum until the clutch pressure builds up until it is adequate to provide forward rotation of the drum. As a result, the slipping of the drum assembly 23 in a reverse direction is prevented and forward rotation is started at point 174 under the influence of clutch C-2.

The drum assembly movement is now under control of the clutch C-2, which device has taken over from band B2. The servo pressure continues to decline and at approximately zero pressure, when the drum assembly 23 is switching from a reverse rotation to a forward rotation under influence of clutch C-2, the forward rotation will be sensed by sensor 63 and through the aforenoted circuitry the solenoid 103 will be de-energized. The pressure in line 93 and chamber 95 will, however, have increased as a result of the increase in pressure on piston 55 of clutch C-2. Thus, the servo will not be applied even though line 97 is pressurized.

The pressure of fluid supplied to clutch C-2 continues to increase and causes the drum assembly 23 to increase its velocity and its acceleration. However, in the same manner as described in connection with a first speed condition to second speed condition shift, when the drum assembly acceleration reaches the desired level or a predetermined amount greater than the desired level, which desired level value is predetermined, the logic module 75 will cause the solenoid 115 of valve 83 to be energized as indicated at 175, thus moving the latter to its broken line position. Thus, the communication between lines 125 and 127 is blocked, while the line 125 is placed in communication with the vent 129. As a result the pressure in clutch C-2 is reduced and the coupling effect of the clutch is reduced. As a result, the rate of acceleration of drum assembly 23 begins to decrease. When the rate of acceleration slows to the desired level or a predetermined level below the desired level, the logic module causes the solenoid 115 of valve 83 to be deenergized, as indicated at 177, thus moving the valve back to its solid line position. The pressure of fluid supplied to clutch C-2 increases and the rate of acceleration of the drum assembly 23 is increased. This cyclical operation of valve 83 is continued as necessary, to cause the speed curve of the drum assembly to undulate and follow substantially along a predetermined path with the average rate of acceleration being substantially constant. When the speed of the drum assembly 23 reaches the same speed as spider 17 the solenoid 103 which is in a deenergized condition, remains deenergized. The pressure of fluid in the clutch C-2 reaches line pressure and levels off at such pressure.

It will be seen that the slope of the speed curve for the drum assembly, i.e., the acceleration, is substantially constant and the length of time which is necessary to bring the drum assembly and the spider 17 to the same speed can be predetermined and controlled, regardless of engine performance and the condition of the components, within certain limits.

When the transmission selector is set in the Drive position and the transmission is in a third speed condition, and it is desired to place the transmission in a second speed condition to permit passing of another vehicle, for example, the accelerator is pressed downward toward the floorboard. This will initiate what is referred to in the art as a kickdown from third speed condition to second speed condition. While the transmission is in third speed condition, the clutch C-1 is operating at line pressure, the curve for which is shown at CL-1 in FIG. 9. In such Figure the voltage across solenoid 115 of clutch C-2 is indicated by curve 179. The drum speed for a typical hydraulically controlled transmission during a kickdown from a third speed condition to a second speed condition is shown by the curve DS-T (Drum Speed - Typical Control). The actual speed of a drum assembly 23 in accordance with this invention, for a given throttle opening, is shown by the undular curve DS. The net apply pressure on the piston 55 of a clutch C-2 of a typical control device is illustrated by curve CL-2-T (Clutch 2 - Typical), while the net apply pressure on the piston 55 of clutch C-2 of this invention is shown by the curve CL-2. The net apply pressure applied on the servo 57 during a third to second speed change is shown by curve FSP.

One of the primary benefits of this invention in a third to second speed condition shift is that the transmission output torque does not drop or dip drastically during the shift. In a typical or conventional hydraulically controlled transmission, when depression of the accelerator signals a kickdown, the hydraulic control (not shown) vent the front servo release chamber 95 and front clutch through line 125. This causes the net apply pressure on clutch C-2 to drop to a first lower level as shown by curve CL-2-7 in FIG. 9. That pressure level is maintained by the servo piston 87 stroking. At the end of the stroke, the servo applies and clutch pressure falls off as indicated at point 180 and 185. As a result the coupling between spider 17 and drum assembly 23 is released rapidly and the band B2 is applied rapidly, thus bringing the drum assembly to a halt. However, as an incident of a typical design, to avoid fight between the clutch C-2 and Band B 2, the clutch releases the drum assembly prior to the time the front servo 57 has been fully actuated to cause band B2 to grip and stop the drum assembly. This causes the output torque from the transmission to take a sudden dip as illustrated by the portion 183 of a curve TO-T (Torque Output - Typical).

It is much preferred to have the torque output of the transmission increase during a kickdown shift without a drastic or insignificant dip. The output torque of the present invention is shown by the curve OT in FIG. 9.

When the throttle opening is suddenly increased signalling a kickdown, the lines 93 and 127 are vented through a restriction as before. However, the servo begins to stroke to maintain pressure in lines 93 and 127. The solenoid 115 of solenoid valve 83 is energized as shown at 185 to move it to its broken line position. In such position the line 125 is connected to vent 119, thus venting the clutch C-2. The speed of drum assembly 23 begins to drop. When the deceleration of the drum assembly increases to a predetermined desired level, or a predetermined amount above such desired level, as indicated by the various circuitry inputs to the logic module 75 described previously, a signal is sent to deenergize solenoid 115, as shown by point 187 on curve 179. This causes valve 83 to move back to its solid line position. Fluid, under pressure from the servo 57, is supplied to the clutch C-2 which increases the couple between drum assembly 23 and spider 17. This, in turn, decreases the deceleration of drum assembly 23. When the level of deceleration is at the desired level of deceleration, or is a predetermined amount greater than the desired level, the circuitry causes the solenoid 115 to be energized again. This cycle is repeated as is necessary to cause the speed curve of drum assembly to follow a predetermined path to bring the drum assembly substantially to a halt. The predetermined curve is that curve necessary to provide the desired output torque curve OT. As the clutch is initially energized as indicated at 185, the output torque will drop slightly as shown by the portion 189 of curve OT.

When the forward rotation of drum assembly 23 is brought down close to zero by the cyclical venting of clutch C-2 as described above, the output torque of the transmission increases slightly as indicated at 191 on curve OT.

As soon as the drum assembly 27 begins to rotate in a reverse direction, due to the release thereof from spider 17 by clutch C-2, the sensor 63 senses such rotation. The rotational speed and acceleration information is fed to logic module 75 which sends a signal to deenergize solenoid valve 83, as indicated at 193. The clutch C-2 begins to be energized under the influence of pressurized fluid supplied thereto through lines 127 and 125, and the drum assembly reverse rotation starts to slow down. As the drum assembly is brought to a zero speed condition and begins to rotate in a forward direction the logic module, upon receipt of the appropriate information regarding the acceleration of the drum assembly, will energize the solenoid valve 83 as indicated at 195. This cyclical action establishes a condition wherein the drum assembly maintains incipient forward and backward movement, i.e., it alternates between slight forward and backward rotation. At this point the pressure of fluid supplied through the solenoid valve 81 begins to increase the net apply pressure on the servo from zero to line pressure, as shown by curve FSP in FIG. 9. The brake band B2 is quickly applied to the drum assembly 23, and since the drum assembly speed is approximately zero, instead of falling rapidly to zero as illustrated by curve DS-T, the band immediately grips the drum and prevents rotation thereof, thus completing the shift from a third speed condition to a second speed condition. As the band B2 is applied the output torque increases as indicated at 197 in curve OT up to the resulting output torque. The solenoid valve 83 is deenergized when the drum assembly speed reaches zero, after the band B2 is initially applied. However, the pressure of fluid supplied to clutch C-2 continues to drop off under the control of the conventional hydraulic circuitry.

Since the drum assembly speed does not drop off rapidly, as in a typical hydraulically controlled transmission, the dip 183 in the output torque is avoided. Accordingly, the output torque curve is generally more even than with conventional hydraulically controlled transmissions.

The apparatus has been described in connection with a first to second speed shift, a second to third speed shift, and a third to second speed shift. However, it will be understood that similar benefits can be obtained with transmissions having four or more forward speeds. The basic control utilizes the sensing of the rotation of some rotating component of the transmission to cause the various friction elements to be applied or released in such a manner that the rates of acceleration of the components are controlled and are uniform regardless of friction element condition or engine performance.

Figure 2B:
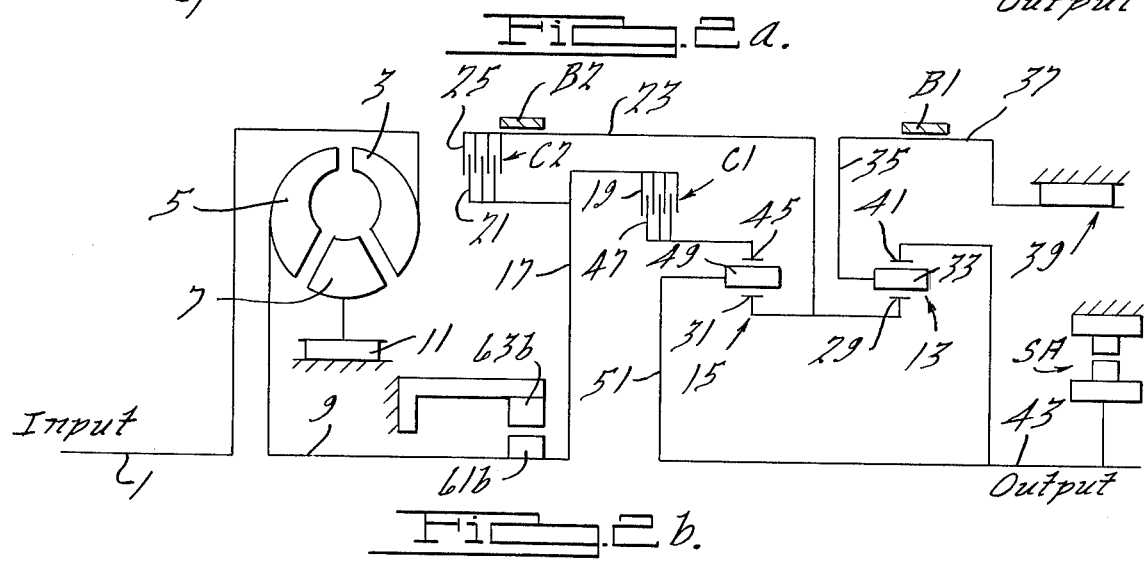
FIGS. 2b and 2c are schematic line diagrams similar to FIG. 2a showing two additional embodiments of the present invention.
Figure 2C:
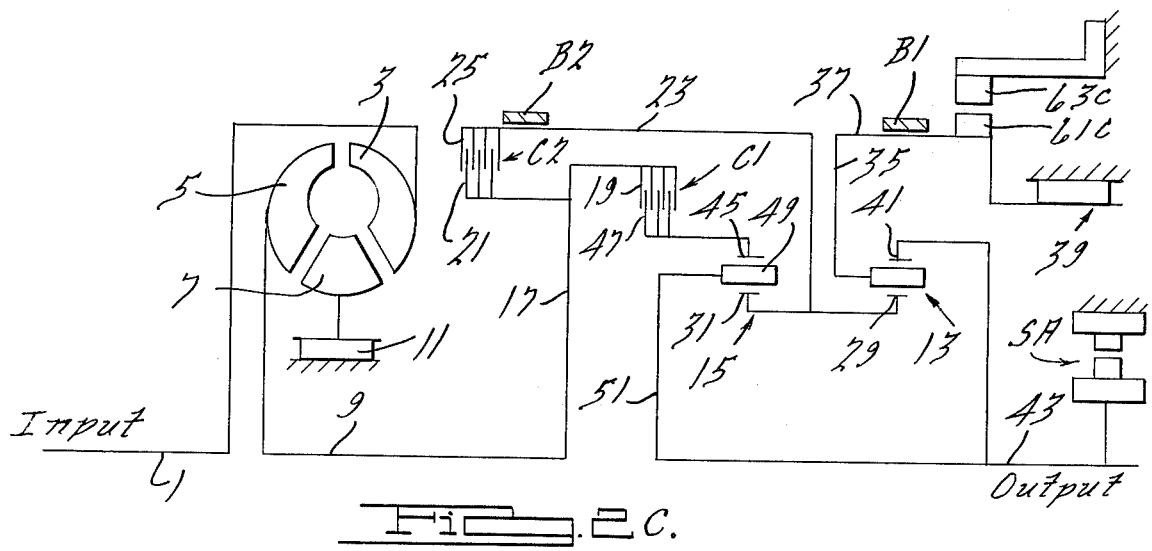

With regard to sensing the rotation of certain components, we now refer to FIGS. 2b and 2c. In FIG. 2b a sensor 63b is shown as sensing the rotation of an exciter wheel 61b connected to input shaft 9. In FIG. 2c a sensor 63c is adapted to sense the rotation of an exciter wheel 61c attached to drum 37. In both Figures a second sensor assembly SA may be employed. Both shaft 9 and drum 37 will serve as the sensed component since they rotate in some ratio to the other components, such as drum assembly 23 at all times. In this regard, the exciter ring 63 may be mounted on any rotating component which rotates, in some ratio to drum assembly 23. Similarly, the additional sensor assembly SA may be used to assist in establishing the rotational speed of any particular component. The logic module is merely modified to factor in such change in ratio.

It will be seen that a transmission of this invention is thus able to adapt to various changes in engine performance, and in the wear condition of the components, and still produce a substantially uniform shift from one speed condition to another. An output torque dip which occurs in many hydraulically controlled transmissions during a third speed to second speed downshift is also eliminated by the controls of this transmission.

In view of the foregoing it will be seen that the several objects and other advantages are achieved.

While several embodiments of the invention have been disclosed and described, it is apparent that other embodiments and modifications of the invention are possible.

We claim:

1. In a control system for an automatic transmission of the type having a housing, an input shaft assembly, an output shaft, a plurality of power transmitting gear assemblies connecting said input shaft assembly and output shaft and adapted to be coupled to provide various ratios between input assembly and output shaft rotation, engaging and disengaging devices for effecting changes in the ratios provided by said power transmitting gear assemblies, and servo means for operating said engaging and disengaging devices, the improvement comprising control means for controlling the application and release of said servo means, means for controlling the operation of said control means to cause said servos to operate in response to the rotational acceleration of at least one of the rotatable components of said assemblies to cause a curve of rotational speed versus time of one of said components to follow substantially along a predetermined path during a shift from one ratio to another, said means responsive to rotational acceleration including means for sensing a rotational characteristic of said one rotatable component, and means connected to said speed sensing means for maintaining said one rotatable component in a substantially incipient slip condition relative to said housing during a portion of a shift from one ratio to another ratio, said one rotatable component, when maintained in said substantially incipient slip condition, alternately and repeatedly being allowed to slip in a rearward direction and then being brought to a substantially zero rotational velocity along a generally undular velocity versus time curve during said portion of said shift.

2. In a control system as set forth in claim 1, wherein said means for causing a curve of the rotational velocity of said one rotatable component versus time to be undular as it is maintained in said incipient slip condition during said portion of a shift from one ratio to another also cause said one rotatable component to follow substantially along a predetermined undular path during another portion of the shift from said one ratio to said second mentioned ratio.

3. In an engine driven vehicle having a throttle valve control, a multispeed power transmission unit comprising input and output shafts, gearing interconnecting said shafts and arranged for selective activation to provide for transmission of a first, a second and third speed drive between said shafts, and automatically operable vehicle speed and throttle valve responsive pressure fluid activatable control means for said gearing arranged to automatically provide for sequential upshifts from first to second to third speed drive and reversely arranged downshifts, said automatically operable transmission shift control means including a first friction coupling device adapted to be engaged when the transmission is in a third speed drive condition and disengaged when said transmission is in a second speed condition, first and second members adapted to be coupled together when said first friction coupling device is engaged, a second friction coupling device for braking said first member, means for applying said second friction coupling device to said first member, said second friction coupling device being applied to said first member when said transmission is in a second speed condition and being in a nonapplied condition relative to said first member when said transmission is in a third speed condition, said means for applying said second friction coupling device including means for causing said second friction coupling device to move said first member from a rotating condition in first speed drive condition to a substantially zero rotational condition in second speed drive condition in a predetermined time along a predetermined velocity curve, and means deactuating said means for applying said second friction coupling device and for actuating said first friction coupling device to cause a curve of the velocity of said first member versus time during a shift from a second speed drive condition to a third speed drive condition to be generally undular, said second friction coupling device keeping said first member in a substantially incipient slip condition for a period, and then releasing said first member while said first friction coupling device is being actuated to rotate said first member, said curve remaining undular when said first member is in said incipient slip condition as well as when rotated by said first friction coupling said first member, when kept in said substantially incipient slip condition and following said generally undular velocity versus time curve, alternately and repeatedly being allowed to slip slightly in a rearward direction, and then being brought to a substantially zero rotational velocity.

4. In an engine driven vehicle having a throttle valve control, a multispeed power transmission unit comprising input and output shafts, gearing interconnecting said shafts and arranged for selective activation to provide for transmission of a first, a second and third speed drive between said shafts, and automatically operable vehicle speed and throttle valve responsive pressure fluid activatable control means for said gearing arranged to automatically provide for sequential upshifts from first to second to third speed drive and reversely arranged downshifts, said automatically operable transmission shift control means including a first friction device adapted to be engaged when said transmission is in a third speed drive condition and disengaged when said transmission is in a second speed condition, friction device actuating means for actuating said first friction device, first and second members adapted to be coupled together when said first friction device is engaged, a second friction device for braking said first member, a servo means for applying said second friction device, said second friction device being applied when said transmission is in a second speed condition and being in a nonapplied condition relative to said first member when said transmission is in a third speed condition, said shift control means including means for causing a curve of velocity versus time for said first member during shifts between said first, second, and third speed drive conditions to follow substantially along a predetermined generally undular path to control the torque output of the transmission, servo means being fluid pressure operated, means for causing said velocity versus time curve to follow said predetermined path including means for electrically causing the intermittent interruption and establishment of the supply of fluid to said servo means for causing said velocity-time curve for said first member to follow said predetermined path during a shift from a first speed drive condition to a second speed drive condition, said friction device actuating means being fluid pressure operated, said means for causing said velocity versus time curve to follow said predetermined path including means for electrically causing the intermittent interruption and establishment of the supply of fluid to said friction device actuating means for causing said velocity-time curve for said member to follow said predetermined undular path during a shift from a second speed drive condition to a third speed drive condition said means for causing said velocity versus time curve to follow said predetermined undular path during a shift from a second speed drive condition to a third speed drive condition including means for maintaining said one member in an incipient slip condition during a portion of the shift, said means for electrically causing the intermittent interruption and establishment of the supply of fluid to said friction device actuating means causing said velocity-time curve for said first member to follow said predetermined undular path during a shift from a third speed drive condition to a second speed drive condition said first member being held in alternating incipient forward rotation and incipient rearward slip conditions during a portion of the shift from a third speed drive condition to a second speed drive condition, said second friction device being maintained in an unapplied condition during a shift from third speed condition to a second speed condition until said first member is brought to said alternating incipient forward rotation and incipient rearward slip conditions, and then being applied to hold said first member against rotation, whereby a significant reduction in the output torque of the transmission is avoided.

5. In a control system for an automatic transmission of the type having a housing, an input shaft assembly, an output shaft, a plurality of power transmitting gear assemblies connecting said input shaft assembly and output shaft and adapted to be coupled to provide various ratios between input assembly and output shafts rotation, engaging and disengaging devices for effecting changes in the ratios provided by said power transmitting gear assemblies, and servo means for operating said engaging and disengaging devices, the improvement comprising control means for controlling the application and release of said servo means, means for controlling the operation of said control means to cause said servos to operate in response to the rotational acceleration of at least one of the rotatable components of said assemblies to cause a curve of rotational speed versus time of one of said components to follow substantially along a predetermined path during a shift from one ratio to another, said means responsive to the rotational acceleration including means for causing a curve of the rotational velocity of one rotatable component versus time to be generally undular during a shift from one ratio to another, said servo means being fluid pressure operated, control means comprising valves adapted to be moved between a first position wherein communication is established between fluid under pressure and said servo means and a second position wherein communication between said servo means and said fluid under pressure is blocked and communication between said servo means and fluid at a pressure lower than in said servo means is established, said means responsive to the rotational acceleration of at least one of the rototable components of said assemblies including electrically operated means adapted to actuate said valves between their first and second positions, and means for signalling said electrically operated means that said one rotatable component has reached a predetermined rotational acceleration, said means responsive to the rotational acceleration further including means for maintaining the rotatable component having a speed curve which follows along said undular path in a substantially incipient slip condition relative to said housing during a portion of a shift from one ratio to another, the speed curve also being undular when the rotatable component is maintained in said substantially incipient slip condition and said rotatable component, when maintained in said substantially incipient slip condition, alternately and repeatedly being allowed to slip slightly in a rearward direction and then being brought to a substantially zero rotational velocity.

* * * * *